United States Patent
Domazakis

(10) Patent No.: US 8,105,641 B2
(45) Date of Patent: *Jan. 31, 2012

(54) PREPARATION METHOD FOR MINCED MEAT PRODUCTS, WITH ADDITION OF FETA TYPE CHEESE AND INCORPORATION OF OLIVE OIL

(75) Inventor: Emmanouil Domazakis, Rethymnon (GR)

(73) Assignee: Creta Farm Societe Anonyme Industrial and Commercial, Rethymnon (GR)

(*) Notice: Subject to any disclaimer, the term of this patent is extended or adjusted under 35 U.S.C. 154(b) by 792 days.

This patent is subject to a terminal disclaimer.

(21) Appl. No.: 10/506,417

(22) PCT Filed: Oct. 14, 2003

(86) PCT No.: PCT/GR03/00045
§ 371 (c)(1),
(2), (4) Date: Aug. 31, 2004

(87) PCT Pub. No.: WO2004/082404
PCT Pub. Date: Sep. 30, 2004

(65) Prior Publication Data
US 2005/0106309 A1    May 19, 2005

(30) Foreign Application Priority Data
Mar. 17, 2003    (GR) .................................. 030100132

(51) Int. Cl.
*A23L 1/317* (2006.01)
(52) U.S. Cl. ........................................ 426/646; 426/513
(58) Field of Classification Search .................. 426/412, 426/646, 513, 516, 804
See application file for complete search history.

(56) References Cited

U.S. PATENT DOCUMENTS

| | | | | | |
|---|---|---|---|---|---|
| 4,716,821 | A | * | 1/1988 | Mally et al. | 99/450.1 |
| 5,368,878 | A | * | 11/1994 | Smick et al. | 426/646 |
| 5,654,028 | A | * | 8/1997 | Christensen et al. | 426/574 |
| 5,766,657 | A | * | 6/1998 | Farkye et al. | 426/39 |
| 5,948,462 | A | * | 9/1999 | Atsuta et al. | 426/583 |
| 6,419,977 | B1 | * | 7/2002 | Born | 426/646 |
| 2003/0049364 | A1 | | 3/2003 | Domazakis | |

FOREIGN PATENT DOCUMENTS

| | | | |
|---|---|---|---|
| CA | 2495904 A1 | | 9/2004 |
| DE | 2210500 A | * | 9/1973 |
| DE | 2756885 A | * | 6/1978 |
| DE | 211709 A | * | 7/1984 |
| DE | 3726204 C | * | 1/1989 |
| DE | 10065633 A1 | * | 8/2001 |
| EP | 0505797 A | * | 6/1997 |
| GB | 1108994 A | * | 6/1965 |
| GB | 1108994 A | * | 4/1968 |
| JP | 63202359 A | * | 8/1999 |
| JP | 2003093021 A | * | 4/2003 |
| WO | WO 02/065860 A1 | * | 8/2002 |
| WO | WO 03000071 A1 | * | 1/2003 |

OTHER PUBLICATIONS www.sonoma sausage.com, Jul. 28, 2003, p. 1 Date verified by web from www.archive.org, attached printout, p. 1.*
http://search.freefind.com/find.html?id=81296093&pageid=r&mode=ALL&n=0&query=feta, Soft cheeses, pp. 8.*
Ranken, M.D. Handbook of Meat Product Technology. (pp. 110-112). Blackwell Publishing. Online version available at: http://knovel.com/web/portal/browse/display?_EXT_KNOVEL_DISPLAY_bookid=1894&VerticalID=0.*

* cited by examiner

*Primary Examiner* — Jyoti Chawla
(74) *Attorney, Agent, or Firm* — Husch Blackwell LLP

(57) ABSTRACT

Methods for the production of minced meat products with the incorporated feta cheese pieces dispersed throughout the product and with the incorporation of olive oil. The products prepared by the methods of the present invention have exceptional solidness, as far as structure is concerned, and retain the organoleptic characteristics of the feta cheese pieces contained within the products, and the physical-chemical characteristics of the incorporated olive oil.

12 Claims, No Drawings

PREPARATION METHOD FOR MINCED MEAT PRODUCTS, WITH ADDITION OF FETA TYPE CHEESE AND INCORPORATION OF OLIVE OIL

BACKGROUND OF THE INVENTION

The name "feta" is registered as a protected designation of origin (PDO) to indicate the salted white cheese traditionally produced in Greece and in particular made with milk originating exclusively from the regions of Macedonia, Thrace, Sterea Ellada (Central Greece), the Peloponnese and the prefecture of Lesbos. The milk used for the production of feta should be sheep's milk or a mixture of sheep's milk and goats' milk. The milk's origin constitute a basic characteristic of the cheese produced, as it provides it with its organoleptic features—its flavour, aroma, colour and even structure and texture.

Many products on the international market, which have been accepted by the large majority of consumers, are based on the addition of the dairy products to meat-based products. Hard cheese (with a short or long maturity time) is primarily used for such products.

According to studies, it has been found that the fatty acid content differs in each kind of cheese and depends on the initial quality of the milk added, on the kind of milk (sheep's milk, cow's milk, goat's milk etc or the percentage of each kind that is added to the milk mixture), the maturation time and the preparation method. Moreover, it also depends on the geographical origin of the milk since local changes in the feedstuffs and in the type of animal diet followed affects the fatty acid content of the milk added to produce the cheese.

The flavour and the aroma, which characterize a certain kind of cheese, results from its maturity, that is the primary decomposition of lactose, fat and protein of the cheese and the secondary conversion of its products, through various fermentation procedures which they undergo during the maturation process of the cheese.

The distinctive flavour and the aroma of each kind of cheese does not result from a specific substance, but from a large number of substances, each one having different taste, but all together and relatively proportionately giving flavour to the cheese and in fact the final flavour which determines which kind of cheese it is. Moreover, from the fatty acids, it is acetic acid which gives an acidic flavour; and rancid butter and caproic, caprylic and capric acids which give a peppery flavour.

Feta is a semi-salted cheese with high acidity. Among the fatty acids contained in the product, acetic acid prevails, but when preparations made from the stomach of a sheep and a goat are included in the volatile enzymes used to coagulate the milk, then, fatty acids C6-C10 strongly contribute to the cheese's flavour, by adding a peppery flavour. Typical feta made with sheep's milk has high ethanol, propanol and butanol content.

The structure of the cheese is a dense mesh of protein fibres differently cross-linked. The fat globules and whey are included in that mesh, that is the humidity and the water-soluble components of the cheese. Over the course of time, during the maturation process of the cheese, many protein fibre links break, releasing calcium and forming soft monocalcium paracaseinate and paracaseinate. The cheese undergoes an internal conversion and obtains its final structure and texture that can be characterized as soft, friable, granular etc.

Every kind of cheese is characterized by the proportion of amino acids, sulphide compounds, acid esters and fatty acids, which result from the proteolysis of the protein mesh.

The uniqueness of feta type cheese products, which have been protected by the Council of the European Union, and which as a cheese has been accepted by a large majority of consumers as a tasty product rich in nutrients, was the reason why we conducted this study.

Nevertheless, the incorporation of oil, compared to the ordinary addition of pork fat, if attempted using classic techniques, gives rises to stability difficulties or the development of destabilizing tensions affecting not only the meat pulp emulsion, but also the final product, which displays the phenomenon of oil exudation.

Moreover, olive oil is a more particular case, as its role in human nutrition is discernible among seed oils and other vegetable oils and as it is also internationally acknowledged for the beneficial characteristics of its natural components (see Omega fatty acids and their protective role, low cholesterol levels, polyphenols and their role).

SUMMARY OF THE INVENTION

This invention concerns the preparation of minced meat products filled with feta type cheese or of minced meat products mixed with feta type cheese and has the following main characteristics:
1. The addition of the feta type cheese
2. The use of fat-free, skeletal muscle (meat)
3. The use of olive oil, in order to substitute part of the animal fat (fat tissue)
4. The addition of special auxiliary substances
5. The application of appropriate technological procedures and mechanisms developed with the aim of:
   Achieving a solid meat pulp with or without a feta type cheese with a stable structure, which would be (a) capable of undergoing appropriate heat treatment, in order to incorporate feta into the emulsion's basic system which consists of muscles proteins, water, olive oil while retaining the solid composition of the feta after protein coagulation and (b) capable of creating, after heat treatment, a solid protein mesh, thus preventing the feta filing from seeping out.
   Achieving the maximum possible conservation of the physical-chemical organoleptic and nutritional characteristics of the feta type cheese.
   Using olive oil, in partial substitution of the ordinary addition of animal fat (fat tissue)
   Achieving the maximum possible conservation of the organoleptic, physical-chemical and nutritional characteristics of the differentiating factor, olive oil It is thus considered appropriate that:
On one hand, olive oil, as an ingredient replacing the animal fat, should be added to cooked/smoked meat preparations, under particularly protective conditions, in order to ensure the maximum possible transfer of its properties to the product.

On the other hand, through the incorporation procedure of the olive oil and the addition of feta, the traditional technical production of cooked and smoked meats should be ensured, by regularly considering, scientific data based on the properties of the proteins, fats, oil and feta and on the properties of the link between them.

It should also be borne in mind that the solidness of "meat emulsions" is strongly affected by:
  The origin and composition of the fat to be incorporated
  The physical—chemicals such as
    Profile of fatty acids (kind and degree of saturation)
    SFI (solid fat index)

The relation between PUFA, MUFA/SUFA to the applicable temperatures at the various production stages.

It is obvious that technologically the differences between pork fat and olive oil should be considered seriously in the production of a solid emulsion.

During the study of this invention, we also took under consideration the following:

The particularity of feta, in order to conserve its initial structure, flavour, aroma and composition (humidity and salt content), when added to the meat pulp, during heat treatment, so as to conserve its nutritional components, its structure and its organoleptic characteristics.

The microbial growth of feta which is different from that of meat, in order to avoid possible development of pathogenic micro-organisms and the increase of the total mesophilic flora in the meat to non-acceptable levels, where the heat treatment is not effective enough to ensure a safe product.

At critical production temperatures (0-4° C. and up to 71° C.), blast freezing temperatures (after heat treatment) and the temperatures at which it is then stored (0-4° C.), its SFI plays an important role.

In the case of olive oil, its characteristics presuppose its incorporation under certain conditions, as follows:

The creation of the maximum possible incorporation of the oil through mechanical processes (mixing, homogenization of the participating components)

The calculation of the ideal quantitative relationship between these components, in order to ensure the maximum possible absorption and conservation of the oil into the emulsion, as well as the maximum possible absorbance of additional water (relationship between fat and proteins, protein and water)

The creation of a solid, impermeable protein mesh around the fat globules, without applying high temperatures to denature the proteins, through mechanical processes and under selected conditions of vacuum application and temperature, during the mixing and homogenization—with the maximum possible dispersion and the maximum size of fat globules.

In the case of feta, its characteristics presuppose its addition under certain conditions, as follows:

The calculation of the ideal quantitative relationship between meat/water/olive oil/feta, in order to achieve the creation of a solid protein mesh in the meat pulp, capable of retaining feta pieces in the meat pulp or of preventing the feta filling from seeping out of the product during heat treatment.

The creation of appropriate physical—chemical conditions (pH, water activity, salt content etc) applied to the product, in combination with the application of appropriate temperatures, during the stages of production, heat treatment, refrigeration (after heat treatment) and preservation, in order to prevent the development of undesired micro-organisms (due to different microbial flora of the two products, meat and feta).

The creation of a solid protein mesh of meat and feta, capable, after the application of mechanical processes—under selected conditions of vacuum application and temperature at the mixing and homogenization, as well as after heat treatment and refrigeration of the product, of maintaining the initial structure, texture and flavour of feta to the maximum degree and the distinctive appearance of minced meat products.

This invention aims at the production of meat-based products:

By adding the feta type cheese

By adding combined auxiliary substances

By applying special technological processes, and

By incorporating olive oil directly and at low temperature and by replacing the maximum possible quantity of animal fat This has been achieved by mixing fat-free meat, in combination with the use of emulsifying additives, water, olive oil, plant fibres, breadcrumbs, salt, and the addition of feta.

Moreover, the solidness of the feta added to the aforementioned products is achieved by the combined use of heat treatment (time, temperature) and the size of the product. The heat transfer rate, during the mild heat treatment is such that it preserves the space lattice of the feta added.

Thus, this invention concerns minced meat products with feta and two production methods, the direct addition of feta to the meat pulp or the filling of the meat pulp with feta.

1. A method for preparing meat products, which is characterized by the addition of feta cheese dispersed throughout the product and the incorporation of olive oil, comprising the steps of: (a) mixing minced meat at a temperature of −2° C. with $H_2O$ at 2° C., salt, plant fibres and breadcrumbs; (b) adding olive oil; (c) continuing mixing after step (b), with simultaneous vacuum application for 5 minutes until the resulting product temperature rises to 4° C.; (d) adding feta cheese; (e) continuing vacuum mixing and refrigeration in the presence of $CO_2$, until there is a distribution of feta cheese throughout the resulting product and it reaches a final temperature of −2° C.; (f) conveying the resulting product to a forming machine, where it is formed in line with a desired shape followed by a mild heat treatment in a linear boiler; and (g) after the mild heat treatment of step (f), the resulting product is deep-frozen in a tunnel, until the core temperature reaches 0° C.

2. The method of paragraph 1, wherein the total duration of the mild heat treatment of step (f) depends on the geometrical characteristics of the resulting product and varies between 5 and 15 minutes.

3. A method for preparing meat-based products, characterized by the addition of feta cheese, as a filling, and the incorporation of olive oil, comprising the steps of: (a) mixing of minced meat at a temperature of −2° C. with $H_2O$ at 2° C., salt, plant fibres and breadcrumbs; (b) adding olive oil; (c) continuing mixing after step (b), with simultaneous vacuum application for 5 minutes until the product temperature rises to 4° C.; (d) providing feta; (e) conveying separately the resulting product of step (c) and the feta of step (d) to an extruder forming machine to form a new resulting product of a desired shape; and (f) applying a mild heat treatment to the new resulting product.

4. Minced-meat products with feta cheese dispersed throughout the products and with the incorporation of olive oil, produced by the method of paragraph 1.

5. Minced-meat products with feta cheese dispersed throughout the products and with the incorporation of olive oil, produced by the method of paragraph 2.

6. Minced-meat products with feta cheese as a filling and with the incorporation of olive oil; produced by the methods of paragraph 2.

7. Minced-meat products with feta cheese as a filling and with the incorporation of olive oil, produced by the methods of paragraph 3.

DETAILED DESCRIPTION OF PREFERRED EMBODIMENTS

The solid incorporation of the animal and vegetable fat (fat globules) and of the additional material (feta pieces) into the meat pulp or into the filling of the product constitutes the technological aim of this invention, which is dealt with using well-known hyphenated techniques that favour the above and concern the adjustment of parameters, such as the special selection and preparation of meat, adjustment of the meat pulp pH, the amount of salt added, the use of auxiliary substances, the addition of olive oil, the treatment-preparation conditions of the meat pulp, heat treatment, and refrigeration of the finished product etc.

Finely chopped meat at a temperature of −2° C. is mixed with water at 2° C. in a mixing machine, while at the same time, salts are added. Then, the blend is mixed for 5 minutes and the plant fibres are added. When the temperature of the mixture rises to 0° C., the olive oil, breadcrumbs and other seasonings are added. Mixing continues with the simultaneous vacuum application of 960 mBAR for 5 min, which firstly aims at freeing the oxygen captured in the mixture, in order to prevent oxidation and secondly at achieving the solidness of the emulsion (olive, water, meat), until the temperature of the mixture rises to 4° C. The total mixing time is 15 min and the absorbed power 20 KW. The mixture is conveyed to the mincing machine, in order to obtain the desired shape of the minced meat products. Then, it is conveyed to the mixing machine, where feta cut into cubes of 1×1 cm are added, while simultaneously vacuum mixing and refrigeration application with $CO_2$ take place, so that the temperature of the mixture after being mixed, does not exceed 0° C. The $CO_2$ acts also as an inhibitory factor to the development of the product's microbial flora. The mixture is conveyed to the forming machine, where through the appropriate arrangements it is formed in line with the desired shape of the final product. The operating conditions of the forming machine in combination with the temperature of the meat pulp—feta (below −2° C.) constitute a critical regulatory factor for preventing the feta pieces from being smashed. The heat treatment of products takes place directly after their forming, in a boiler at a room temperature of 96-99° C. and relative humidity 95-96%. The length of time for which the product remains in the boiler depends on the geometrical characteristics of the product and varies between 5 to 15 minutes. Conveyors transfer the product right after heat treatment to a blast refrigeration tunnel at an ambient temperature of −28° C., so that the temperature of the product's core falls to 0° C.

Finely chopped meat at a temperature of 2° C. temperature is mixed with water at 2° C. in a mixing machine, while salts are added. Then, mixing continues for 5 minutes and plant fibres are added. When the temperature of the mixture rises to 0° C., the olive oil, breadcrumbs and other seasonings are added. Mixing continues with the simultaneous vacuum application of 960 mBAR for 5 min, which aims firstly at freeing the oxygen captured in the mixture, in order to prevent oxidation, and secondly at achieving the solidness of the emulsion (olive, water, meat), until the temperature of the mixture rises to 4° C. The total mixing time is 10 min and the absorbed power 20 KW. This is followed by a drop in the mixture's temperature by channeling and releasing $CO_2$ as a refrigerant, until the mixture's temperature falls −2° C. The $CO_2$ acts also as an inhibitory factor to the development of the product's microbial flora. The mixture and the feta are conveyed to an extruder type forming machine, where through the appropriate arrangements it is formed in line with the desired shape of the final product. The operating conditions of the forming machine in combination with the temperature of the meat pulp—feta (below −2° C.) constitute a critical regulatory factor, in order to prevent the meat pulp mesh from breaking during product forming—filling and the feta filling from seeping out during heat treatment. Heat treatment of products takes place directly after the forming in a boiler at an ambient temperature of 96-99° C. and relative humidity 95-96%. The length of time for which the product remains in the boiler depends on the geometrical characteristics of the product and varies between 5 to 15 minutes. Conveyors transfer the product right after the heat treatment to a blast refrigeration tunnel at an ambient temperature of −28° C., so that the temperature of the product's core falls to −0° C.

Minced meat products with feta and olive oil, considered under this invention, have an exceptional solidness (cohesion) as far as their structure is concerned, due to the use of fat-free meat, the application of low temperatures and vacuum production. The physical-chemical characteristics of olive oil and the organoleptic characteristics of feta contained in the products remain unaltered, due to the low temperatures applied during the production procedure.

The invention claimed is:

1. A method for preparing meat products wherein feta cheese pieces are dispersed throughout the products and olive oil is incorporated in a way that the feta cheese pieces maintain their texture and flavor, comprising the steps of:
    (a) Mixing raw minced meat at a temperature of −2° C. with $H_2O$ at 2° C., salt, plant fibres and breadcrumbs;
    (b) Adding olive oil when the resulting mixture rises to 0° C.;
    (c) Continuing mixing after step (b), with simultaneous vacuum application until the temperature of the resulting mixture rises up to 4° C.;
    (d) Adding feta cheese pieces;
    (e) Continuing vacuum mixing and refrigerating the resulting mixture in the presence of $CO_2$, until there is a stable structure of olive oil and feta cheese pieces throughout the resulting coarsely comminuted non-encased meat mixture with the feta cheese pieces being identifiable from the surrounding meat matrix, and the resulting mixture reaches a final temperature of −2° C.;
    (f) Conveying the resulting mixture to a forming machine, where it is formed in line with a desired shape followed by a heat treatment at 96-99° C. and relative humidity of 95-96% in a linear boiler, wherein the feta cheese pieces are identifiable and retain their organoleptic characteristics; and
    (g) After the heat treatment of step (f), the resulting mixture is deep-frozen in a tunnel until the core temperature reaches 0° C.

2. Minced-meat products with feta cheese pieces dispersed throughout the products and with the incorporation of olive oil, produced by the method of claim 1.

3. The method of claim 1, wherein the stable incorporation of feta cheese pieces is substantially due to the combination of breadcrumbs and plant fibres.

4. The method of claim 1, wherein the total duration of the heat treatment of step (f) varies between 5 and 15 minutes, depending on the size of the resulting mixture.

5. Minced-meat products with feta cheese pieces dispersed throughout the products and with the incorporation of olive oil, produced by the method of claim 4.

6. A method for preparing meat-based products with the addition of feta cheese pieces, as a filling, and the incorporation of olive oil in a way that the feta cheese pieces maintain their texture and flavor, comprising the steps of:
  (a) Mixing of raw minced meat at a temperature of −2° C. with $H_2O$ at 2° C., salt, plant fibres and breadcrumbs;
  (b) Adding olive oil;
  (c) Continuing mixing after step (b), with simultaneous vacuum application until the temperature of the resulting mixture rises up to 4° C.;
  (d) Providing feta cheese pieces;
  (e) Conveying separately the resulting mixture of step (c) and the feta cheese pieces of step (d) to an extruder forming machine to form a new resulting coarsely comminuted non-encased meat mixture of a desired shape with the feta cheese pieces being identifiable from the surrounding meat matrix; and
  (f) Applying a heat treatment to the new resulting mixture, wherein the feta cheese pieces are identifiable and retain their organoleptic characteristics.

7. Minced-meat products with feta cheese pieces as a filling and with the incorporation of olive oil, produced by the methods of claim 6.

8. The method of claim 6, wherein the feta cheese pieces comprise from about 20% to 50% by weight of the resulting mixture.

9. The method of claim 6, wherein the stable incorporation of feta cheese pieces is substantially due to the combination of breadcrumbs and plant fibres.

10. A method for preparing meat products wherein feta cheese pieces are dispersed throughout the products and olive oil is incorporated in a way that the feta cheese pieces maintain their texture and flavor, comprising the steps of:
  (a) Mixing raw minced meat at a temperature of −2° C. with $H_2O$ at 2° C., salt, plant fibres and breadcrumbs, wherein the plant fibres comprise from about 0.4% to 2% by weight of the resulting mixture;
  (b) Adding olive oil when the resulting mixture rises to 0';
  (c) Continuing mixing after step (b), with simultaneous vacuum application until the temperature of the resulting mixture rises up to 4° C.;
  (d) Adding feta cheese pieces;
  (e) Continuing vacuum mixing and refrigerating the resulting mixture in the presence of $CO_2$, until there is a stable structure of olive oil and feta cheese pieces throughout the resulting coarsely comminuted non-encased meat mixture with the feta cheese pieces being identifiable from the surrounding meat matrix, and the resulting mixture reaches a final temperature of −2° C.;
  (f) Conveying the resulting mixture to a forming machine, where it is formed in line with a desired shape followed by a heat treatment at 96-99° C. and relative humidity of 95-96% in a linear boiler, wherein the feta cheese pieces are identifiable and retain their organoleptic characteristics; and
  (g) After the heat treatment of step (f), the resulting mixture is deep-frozen in a tunnel until the core temperature reaches 0° C.

11. The method of claim 10, wherein each individual feta cheese piece present in the resulting mixture is from about 2 to 4 millimeters.

12. The method of claim 10, wherein the stable incorporation of feta cheese pieces is substantially due to the combination of breadcrumbs and plant fibres.

* * * * *